United States Patent [19]

Chiu

[11] Patent Number: 5,766,537
[45] Date of Patent: Jun. 16, 1998

[54] METHOD FOR MAKING A SEAMLESS TUBULAR MEMBER

[76] Inventor: Ching-Chung Chiu, No. 416, Wen Hua Road, Jen De Hsiang, Tainan County, Taiwan

[21] Appl. No.: 825,522

[22] Filed: Mar. 31, 1997

Related U.S. Application Data

[63] Continuation-in-part of Ser. No. 664,647, Jun. 17, 1996, abandoned.

[51] Int. Cl.[6] .................... B29C 15/46; B29C 67/24
[52] U.S. Cl. .................... 264/328.17; 264/332; 164/55.1
[58] Field of Search .................. 264/328.1, 328.17, 264/211.11, 328.18, 328.19, 332; 164/55.1

[56] References Cited

U.S. PATENT DOCUMENTS

| | | | |
|---|---|---|---|
| 4,122,143 | 10/1978 | Momotari et al. | 264/347 |
| 4,784,812 | 11/1988 | Saitoh et al. | 264/211.11 |
| 5,362,791 | 11/1994 | Ebenhoech et al. | 264/344 |
| 5,543,174 | 8/1996 | Rutz | 264/328.17 |
| 5,563,001 | 10/1996 | Gay | 264/328.17 |

FOREIGN PATENT DOCUMENTS

| | | | |
|---|---|---|---|
| 62-238715 | 10/1987 | Japan | 264/328.17 |
| 4-35002 | 2/1992 | Japan | 264/328.17 |
| 6-151149 | 5/1994 | Japan | 264/328.17 |

*Primary Examiner*—Jill L. Heitbrink
*Attorney, Agent, or Firm*—Charles E. Baxley

[57] ABSTRACT

A method is used for manufacturing a seamless tubular member by a plastic and metal powder mixture. A liquid DOP material is added into the plastic and metal powder mixture so as to soften the metal powder material and so as to decrease the melting point of the metal powder material to a melting point closer to that of the plastic material. The plastic and metal powder mixture and the liquid DOP solution material are disposed in a container of a protruding mechanism and are heated to a temperature greater than the melting point of the plastic material so as to melt the metal powder material and the plastic material simultaneously. The melted plastic and metal mixture is then injected into a mold cavity so as to form the seamless tubular member.

2 Claims, 2 Drawing Sheets

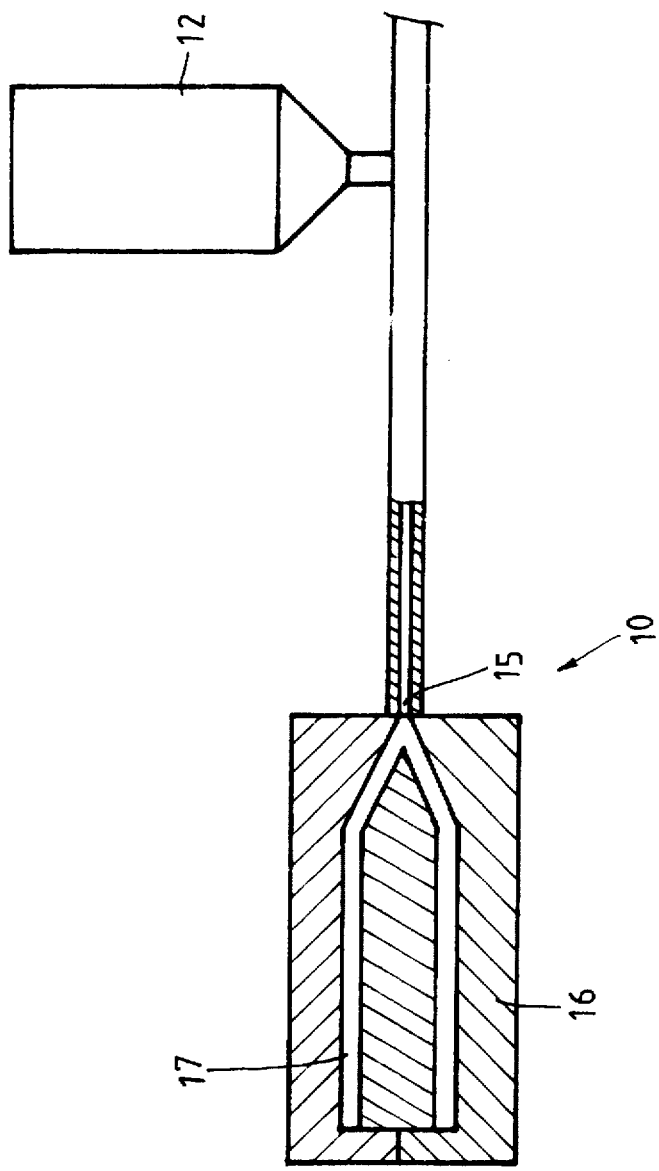

METHOD FOR MAKING A SEAMLESS TUBULAR MEMBER

This is a continuation-in-part of application Ser. No. 08/664,647 filed Jun. 17, 1996, now abandoned.

BACKGROUND OF THE INVENTION

1. Field of the Invention

The present invention relates to a method, and more particularly to a method for making a seamless tubular member.

2. Description of the Prior Art

Typical plastic tubular members can be easily made by molding processes. However, the plastic material includes a low hardness such that the product may be easily damaged. Typical metal tubular members normally include a longitudinal slit formed therein. A painting layer or an outer cover layer is wound around the tubular members so as to cover the slit. However, the paint and the outer cover layer may be easily damaged or disengaged from the tubular members.

The present invention has arisen to mitigate and/or obviate the afore-described disadvantages of the conventional tubular members.

SUMMARY OF THE INVENTION

The primary objective of the present invention is to provide a method for making a seamless metal tubular member.

In accordance with one aspect of the invention, there is provided a method for manufacturing a seamless tubular member, said method comprises preparing and mixing a metal powder material and a plastic material together so as to form a plastic and metal powder mixture, adding a liquid DOP material into said plastic and metal powder mixture so as to soften said metal powder material and so as to decrease a melting point of said metal powder material to a melting point closer to that of said plastic material, preparing a protruding mechanism, said protruding mechanism including a mold device having a mold cavity formed therein, said mold cavity having a shape corresponding to that of said tubular member, said protruding mechanism including a container for receiving said plastic and metal powder mixture and said liquid DOP material and including a nozzle for injecting said plastic and metal powder mixture and said liquid DOP material into said mold cavity, disposing said plastic and metal powder mixture and said liquid DOP material into said container of said protruding mechanism, heating said plastic and metal powder mixture and said liquid DOP material to a temperature greater than the melting point of said plastic material so as to melt said metal powder material and said plastic material simultaneously, stirring said melted plastic and metal mixture so as to form a well blended mixture, injecting said melted plastic and metal mixture into said mold cavity of said mold device by said protruding mechanism, and cooling said melted plastic and metal mixture received in said mold cavity so as to form the seamless tubular member.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a cross sectional view illustrating a protruding mechanism for conducting a method in accordance with the present invention.

DETAILED DESCRIPTION OF THE PREFERRED EMBODIMENT

Referring to FIG. 1, a method in accordance with the present invention is provided for manufacturing a seamless tubular member which is made of plastic and metal materials. A suitable proportion of metal powder material is added into a plastic material, e.g. 1:1, so as to form a plastic and metal powder mixture. One example of the plastic powder material is cellulose acetate. The metal powder material may include copper powder, aluminum powder, gold bronze pastes, gold copper pastes, etc. A liquid or solution which is named D.O.P. or D.E.H.P. diethyl hexyl phthalate (abbreviated as DOP hereinafter) is added into the plastic and metal powder mixture so as to soften the metal powder material and so as to decrease the melting point of the metal powder to a melting point closer to that of the plastic material.

Figure 3:
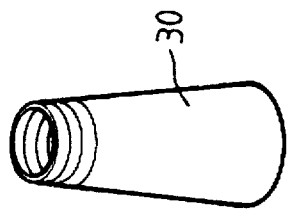
FIGS. 2 and 3 are perspective views illustrating two types of tubular members to be made by the method in accordance with the present invention.
Figure 2:
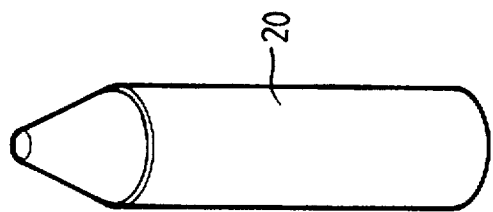

The plastic and metal powder mixture and the liquid DOP material are then disposed in a typical container 12 of a protruding mechanism 10 and are then heated to a temperature greater than the melting point of the plastic material. It is to be noted that the melting point of the metal powder is also decreased and close to that of the plastic material after the liquid DOP material is added into the plastic and metal powder mixture, such that the metal powder may also be melted at the temperature greater than the melting point of the plastic material. The melted plastic and metal mixture is then stirred so as to form a well blended mixture. The protruding mechanism 10 includes a nozzle 15 aligned with an opening of a mold cavity 17 of a mold device 16 so as to inject the melted plastic and metal mixture into the mold cavity 17. The mold cavity 17 includes a shape corresponding to a tubular member. FIGS. 2 and 3 show two types of the tubular members. After aging and cooling process, the melted plastic and metal mixture which is injected into the mold cavity 17 will become cool so as to form a seamless tubular member which is made of plastic and metal materials.

It is most important that the liquid DOP material is added into the plastic and metal powder mixture so as to soften the metal powder material and so as to decrease the melting point of the metal powder to the melting point of the plastic material, such that both the plastic and the metal materials may be melted when the mixture is heated to a temperature greater than the melting point of the plastic material. The plastic and the metal materials may thus be well blended together so as to form an excellent product.

Accordingly, the method in accordance with the present invention includes a special process for decreasing the melting point of the metal powder material to the melting point of the plastic material so as to allow both the plastic and the metal materials to be melted simultaneously and so as to allow both the plastic and the metal materials to be well blended together.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a seamless tubular member, said method comprising:

preparing and mixing a metal powder material and a plastic material together so as to form a plastic and metal powder mixture, adding a solution into said plastic and metal powder mixture so as to soften said metal powder material and so as to decrease the melting point of said metal powder material to that closer to that of said plastic material, preparing a protruding mechanism, said protruding mechanism including a mold device having a mold cavity formed therein, said mold cavity having a shape corresponding to that of said tubular member, said protruding mechanism including a container for receiving said plastic and metal powder mixture and said solution and including a nozzle for injecting said plastic and metal powder mixture and said solution into said mold cavity, disposing said plastic and metal powder mixture and said solution into said container of said protruding mechanism, heating said plastic and metal powder mixture and said solution to a temperature greater than the melting point of said plastic material so as to melt said metal powder material and said plastic material simultaneously, stirring said melted plastic and metal mixture so as to form a well blended mixture, injecting said melted plastic and metal mixture into said mold cavity of said mold device by said protruding mechanism, and cooling said melted plastic and metal mixture received in said mold cavity so as to form the seamless tubular member.

2. A method according to claim 1, wherein said solution is diethyl hexyl phthalate.

* * * * *